United States Patent [19]
Williams

[11] 3,947,398
[45] Mar. 30, 1976

[54] SURFACING COMPOSITION CONTAINING AQUEOUS RESIN EMULSION AND CALCIUM SULFATE HEMIHYDRATE PLASTER

[76] Inventor: John Williams, 'Merileys', Fawkham Ave., New Barn, Longfield, Kent, England

[22] Filed: Aug. 29, 1972

[21] Appl. No.: 284,620

Related U.S. Application Data

[63] Continuation-in-part of Ser. No. 153,793, June 16, 1971, abandoned.

[30] Foreign Application Priority Data
May 13, 1971  United Kingdom............... 14656/71
May 12, 1972  South Africa....................... 72/3241

[52] U.S. Cl. . 260/29.6 S; 260/29.4 UA; 260/42.13; 427/258
[51] Int. Cl.² .................... C08L 25/04; C08L 31/04; C08L 33/08; C08L 33/10
[58] Field of Search...................... 260/29.6 S, 42.13

[56] References Cited
UNITED STATES PATENTS

| | | | |
|---|---|---|---|
| 2,536,375 | 1/1951 | Koehn et al. .................... | 260/29.6 S |
| 2,557,083 | 6/1951 | Eberl ............................... | 260/29.6 S |
| 2,655,148 | 10/1953 | Eberl et al. ..................... | 260/29.6 S |
| 2,806,008 | 9/1957 | McNulty et al. ................ | 260/29.6 S |
| 2,997,448 | 8/1961 | Hochberg ....................... | 260/29.6 S |
| 3,121,702 | 2/1964 | Sherr et al. ..................... | 260/29.6 S |
| 3,256,223 | 6/1966 | Heijmer .......................... | 260/29.6 S |
| 3,544,344 | 12/1970 | Pratt et al. ..................... | 260/29.6 S |
| 3,563,777 | 2/1971 | Pratt et al. ..................... | 260/29.6 S |
| 3,620,778 | 11/1971 | Morrell ........................... | 260/29.6 S |

FOREIGN PATENTS OR APPLICATIONS
796,807  10/1968  Canada

*Primary Examiner*—Harold D. Anderson
*Attorney, Agent, or Firm*—Stewart and Kolasch, Ltd.

[57] ABSTRACT

The invention provides a fluid plaster composition having desirable flow properties and being capable of setting to a hard material, said composition comprising a calcium sulphate alpha-hemihydrate plaster and an aqueous resin emulsion capable of forming a hard material on removal of water, the relative proportions of the plaster and the resin being such that the plaster takes up the major part of the water in the emulsion when it sets. The resins are preferably homopolymers and copolymers of lower alkyl acrylates and methacrylates, styrene and vinyl acetate. The composition is particularly useful for providing a self-levelling, quick-setting, tough flooring composition which is stable at usual ambient temperatures. Other uses include the casting of art objects such as statuettes.

14 Claims, No Drawings

SURFACING COMPOSITION CONTAINING AQUEOUS RESIN EMULSION AND CALCIUM SULFATE HEMIHYDRATE PLASTER

This application is a continuation-in-part of application Ser. No. 153,793, filed on June 16, 1971, now abandoned.

The invention relates to plaster compositions and in its preferred forms provides surfacing compositions capable of giving a self-smoothing, flexible, non-shrink, water, oil and grease resistant flooring surface.

One of the difficulties encountered with plaster compositions is that a substantial excess of water weakens the final product by leaving voids but, on the other hand, is necessary to provide a fluid composition which will flow to give a smooth flat surface when applied to a substantially horizontal substrate. We have now found that the use of a resin emulsion in admixture with the plaster solids has a surprising effect on the flow properties of the resulting composition and that the amount of water can be substantially reduced to give a composition with the desirable flow properties which sets to a strong solid material. Much improved self-levelling and self-smoothing properties are in fact obtainable as compositions according to the invention with relatively low water contents will flow and level under their own weight.

According to the invention there is provided a fluid plaster composition comprising a calcium sulphate alpha-hemihydrate plaster and an aqueous resin emulsion, the relative proportions of the plaster and the resin emulsion being such that the plaster takes up the major part of the water in the emulsion when it sets. The term "emulsion" is used in this specification in the technical sense rather than in the true scientific sense as the resin will normally be a solid and not a liquid at the temperatures in question.

The resin content of the composition imparts substantial wear and water resistance to the set plaster and permits it to be used as a flooring material.

The composition would normally be supplied to the user as a two-pack system and when mixed together controllable working and setting times can be achieved of approximately 15 minutes to 4 hours.

The composition thus comprises gypsum plaster and an aqueous emulsion of polymer resin or the like and may also contain, to achieve varying rheological properties to meet different conditions of applications, plasticizers, solvents, calciferous mineral powders, silaceous aggregates, defoamers, rubber crumb, cork granules, asbestos fibre, pigment powder and/or pastes and the like. The composition may be applied in a number of ways, e.g. simply pouring from a vessel, by spray gun in conjunction with pressurised containers or by power operated liquid transference pumps. The composition can be pigmented to most colours; by applying simultaneously two different colours using a special spray gun, two-tone mottle effects can also be achieved; by making different to each other the viscosity of the simultaneously applied coloured compositions or by differing the setting time of the two coloured compositions, one colour from the other, raised patterns can be achieved.

The preferred compositions are ideally suited for domestic and light industrial flooring and, when used in conjunction with suitable aggregates, heavy industrial floorings, as water-resistant toppings for open balcony walkways, decks of multi-story car parks, surfacing material over asphalt or in place of asphalt for concrete and other roofs. Also due to the controllable rapid setting properties of the compositions they are ideally suited for road and aircraft runway markings and for road antiskid areas when the compositions are used in conjunction with iron silicates, calcined flint, carborundum, flint or calcined bauxite etc. The compositions can be used for the surfacing of ship decks and can also be used as a factory applied decorative and protective facing material for plywood, chipboard, hardboard, plasterboard, concrete, asbestos sheet etc.

The polymer resins useful in this invention are usually polymers of ethylenically unsaturated monomers and include vinyl resins and polymers of acrylates and methacrylates, particularly alkyl esters of acrylic and methacrylic acids in which the alkyl group has up to twelve carbon atoms. Examples include methyl acrylate, butyl acrylate, ethyl acrylate, methyl methacrylate, ethyl methacrylate, butyl methacrylate, hexyl methacrylate and lauryl methacrylate. Other resin emulsions include polyvinylacetate emulsions and polystyrene emulsions. Copolymers of two or more of the three classes of monomer (acrylate and methacrylate; vinyl acetate; styrene) can be used as desired depending on the properties required in the final product. For example, polystyrene is alkali-resistant and water-resistant but its long-term aging properties are not good. Polyvinylacetate has low water-resistance but in certain applications, e.g. when the composition is applied to a tar or bitumen base, this is not important. The acrylate and methacrylate resins have good long term aging properties and good water and alkali resistance but they do not have good flow properties and they are more expensive than polyvinylacetate and polystyrene. Styrene/acrylate copolymers are preferred and one suitable copolymer is a copolymer of acrylate and styrene in a weight ratio of 1:1. Polyvinyl chloride, vinylidene and other vinyl resins can also be used. Natural latexes are also envisaged. The term "copolymer" as used herein is intended to include polymer blends as well as true copolymers.

It is desirable, though not essential, for the resin to form a continuous film or matrix on setting as this improves strength and water resistance. For this purpose, the very hard resins, such as polystyrene are desirably blended with softer resins or plasticizers, or a softer comonomer is incorporated therein.

The resins in the compositions of this invention desirably set to a resin phase which is hard at room temperature (65°F) although some softening is permissible at higher temperatures as explained below. It is difficult to quantify hardness but a convenient test is to run a finger nail along the surface of the resin. Desirably the resin should be sufficiently hard to prevent a groove being formed using this test.

The emulsions normally contain about 50% resin solids but a wide variation e.g. 35% to 60% particularly 50 – 56% is possible, the particle size desirably being 0.1 to 1.5 microns.

For details of resin emulsion formulation, reference is directed to "The Fundamental Principles of Polymerisation" by D'Alelio published by Wiley in 1952 and "Principles of Polymer Chemistry" by R.J. Flory published by Cornell University Press in 1969.

It is believed that the surfactants used to prepare the emulsions play an important part in the improvement of the fluid plaster composition and it is postulated that some surfactant is adsorbed in the plaster particles. It has been found to be important that the particles of resin solids remain in an emulsified finely divided form in the composition and are not de-stabilised e.g. by the calcium ions or over-absorption of the surfactant. On the other hand, the resin apparently plays an important part as the surfactants have substantially no effect in a composition without the resin. The improved flow properties achieved by incorporation of the resin are thus most surprising as one would assume that more water would be needed rather than less to suspend the greater number of solid particles. The ability of the plaster composition to form a smooth surface apparently depends on the maintenance of a relatively high surface tension with a relatively low interfacial tension at the surface of the solid particles. The surface tension of the compositions of the invention is desirably 35 to 65 dynes per cm. but in most cases is of the order of 50 to 55 dynes per cm. (as opposed to 73 dynes per cm for water).

In practice, the optimum composition will be determined by testing commercially available resin emulsions to ascertain the best for the particular technical application in which the invention is being used.

The gypsum plaster used for the invention may comprise a wide variety of settable forms of calcium sulphate and may include anhydrous calcium sulphate, calcium sulphate dihydrate and/or chemical gypsum, commonly called synthetic gypsum, as well as calcium sulphate hemihydrate and Keen's cement which is produced by the re-calcination of calcined gypsum. However, it has been found to be highly desirably to use an alpha plaster, i.e. a calcium sulphate alpha-hemihydrate plaster, of reasonable purity.

There are basically two commercially available hemihydrates ($CaSO_4 \cdot \frac{1}{2}H_2O$) conventionally known as the alpha and beta forms. The alpha-hemihydrate is generally prepared by the placing of lump gypsum into an autoclave and calcining at controlled super-atmospheric pressure in the presence of steam whereas the beta-hemihydrate is the result of heating the dihydrate at atmospheric pressure in either a kettle or a rotary calciner. Some processes employ additives or other means by which the resultant plaster has enhanced strength properties or setting time characteristics. For example, in the autoclave system the percolation of crystal habit modifiers is said to improve compressive strength. Whilst there is no generally agreed criterion for distinguishing the two forms of hemihydrate it is accepted, that, although similar in chemical composition, the outstanding physical difference is the water/plaster ratio required to produce workable mixes. The dissimilarity in the physical nature of the plaster particles of the two forms arises from the difference in the surface properties. The short, squat but larger alpha crystals have low water absorption and smaller surface area per unit weight which means a lower water requirement to convert the material into a pourable slurry. Gypsum calcined in kettles or rotary kilns gives plasters having conglomerates of fine crystals which take up a large quantity of water thus forming voids within the structure upon evaporation and impairing the strength of the products cast. Alpha hemihydrate plaster will give a workable composition with about 30 to 45 cc of water to 100 grams although the composition is not pourable in the lower part of the range whereas a beta plaster will require about 50 to 80 cc. for a pourable slurry. It has been well established that in general, the lower the weight of water to weight of dry plaster solids the greater the strength of the resultant cast. For example, casts made from alpha plaster at a consistency of about 30 cc will have a compressive strength as high as 10,000 lbs/in.$^2$ whilst a cast poured at a consistency of 45 cc may well have a strength under 5,000 lbs/in$^2$. Beta plasters in cast form will have compressive strengths well below those of alpha plasters or anhydrous types such as Keen's cement. The more compact, stable and dense alpha-hemihydrate is therefore to be preferred for this invention. Desirably it has a compressive dry strength of not less than 6,000 lbs/in$^2$ at a plaster/water ratio of 100:30. Normally an alpha plaster will have a dry strength of not less than 3,500 or 4,000 lbs/in.$^2$ but beta plasters will fall below this figure. For a further discussion of alpha and beta plasters, see Ullmann's Encyclopaedie der technischen Chemie, Vol 8 (1957) pages 97 to 132.

Conventional accelerators and retarding agents can be used to react with the calcium sulphate solids if required to adjust the pot life and setting times of the mixed compositions, e.g. potassium sulphate, sodium citrate, alum etc. Surface-active agents such as the alkyl-aryl sulfonates can be used for assisting the wetting out of the surface to which the composition is applied and to improve the wetting out of the plaster solids when being mixed. Other specific properties can be achieved by adding freeze-resistant agents, anti-bacterial/fungicides, thickeners and stabilisers such as derivatives of cellulose ethers, polyvinyl alcohol, natural and synthetic colloidal clays and the like.

The flexibility of the applied and set compositions can be regulated to suit differing applications by the copolymerization or blending of different polymer resins as already mentioned, thereby achieving internal plasticization, or by external plasticization using a number of conventional plasticizers such as di-octyl phthalate, di-butyl phthalate, di-butyl glycol phthalate, tricresyl phthalate etc. Solvents can be used as temporary plasticizers which also assist in film integration of the resin within the set composition; some of the solvents that have been found satisfactory for this purpose are xylene, butyl acetate, toluene, ethyl acetate etc. It has been found that urea and/or melamine formaldehyde resins can also be incorporated in the composition to improve the working fluidity of the material and to enhance the set hardness of the composition.

As already mentioned the complete composition will be normally supplied as a two pack system which for illustration can be called 'A' and 'B'. 'A' is the premixed and packaged liquid component (including the resin) and 'B' the premixed and packaged powdered component. 'A' and 'B' are mixed together manually or mechanically just prior to the application being carried out. The mixed material can have a pre-adjusted pot life and setting time of 15 minutes to 4 hours as required.

When the two-tone colour effect is needed or when a raised pattern is required the twin packs are mixed and with the use of pressure containers the two mixed complete compositions are pressurised and fed simultaneously through a special dual liquid spray gun.

In the following Examples the resins are the 'Revacryl', 'Vinacryl', 'Emultex' and 'Revinex' types, the calcium sulphate is the alpha hemihydrate (Crystacel or Herculite) and the anti-foaming agent is of the 'Nopco' or 'Bevaloid' type.

Example 1
| No. 1 Part 'A' Pack: | Percent by weight | |
|---|---|---|
| Styrene/butyl acrylate (1:1) copolymer emulsion | 18.75 | (51% resin solids) |
| Water (additional) | 6.25 | |
| Toluene (solvent) | 2.0 | |
| Part 'B' Pack | | |
| Alpha-hemihydrate calcium sulphate plaster (Crystacel) | 71.0 | |
| Green powdered pigment | 2.0 | |
| No. 2 Part 'A' Pack | | |
| Styrene/butyl acrylate (1:1) copolymer emulsion | 81.75 | (51% resin solids) |
| Water (additional) | 6.25 | |
| Toluene (solvent) | 2.0 | |
| Part 'B' Pack | | |
| Alpha-hemihydrate calcium sulphate plaster (Crystacel) | 71.0 | |
| White powdered pigment | 2.0 | |

'A' and 'B' of No. 1 are mixed together and 'A' and 'B' of No. 2 are mixed together. The two separate mixes are then simultaneously pressurized through fluid lines using two pressure containers, both mixes then being extruded simultaneously at the head of a special dual liquid spray gun applicator. The applied materials flow and set to present a smooth two-tone (mottled green and white in this particular example) surface. A wide variety of shades and combinations of colours can be obtained. If the pressures that are used are equal for each pressure container then the colour of the mottle pattern will be balanced, if however the pressure is increased for one of the colours then that colour will be predominant.

Example 2
| No. 1 Part 'A' Pack | Percentage by weight | |
|---|---|---|
| Styrene/butyl acrylate (2:3) copolymer emulsion | 17.5 | (51% resin solids) |
| Water (additional) | 5.75 | |
| Xylene (solvent) | 0.625 | |
| Anti-foaming agent (Nopco) | 0.625 | |
| Sodium Citrate | 0.5 | |
| Part 'B' Pack | | |
| Alpha-hemihydrate calcium sulphate plaster (Crystacel) | 72.00 | |
| Pigment powder | 3.0 | |
| No. 2 Part 'A' Pack | | |
| Styrene/butyl acrylate (2:3) copolymer emulsion | 13.75 | |
| Water (additional) | 5.0 | |
| Xylene (solvent) | 0.625 | |
| Anti-foaming agent (Nopco) | 0.625 | |
| Part 'B' Pack | | |
| Alpha-hemihydrate calcium sulphate plaster (Crystacel) | 40.0 | |
| Fine granite (−52 + 200 mesh) | 38.0 | |
| Pigment powder | 2.0 | |

The mixing of the above compositions and the procedure for the application of the mixed compositions is the same as for Example 1. The No. 1 mix has been retarded to set slower than the No. 2 mix and the No. 2 mix is of a higher viscosity than the No. 1 mix, so the applied set and dried compositions have a raised pattern.

Example 3
| Part 'A' Pack | Percent by Weight | |
|---|---|---|
| Vinyl acetate/2-ethylhexyl acrylate (9:1) copolymer emulsion (the acrylate reduces the brittleness of the vinyl acetate) | 25.0 | (about 50% resin solids) |
| Water (additional) | 23.125 | |
| Anti-foaming agent (Nopco) | 1.25 | |
| Solvent (Toluene) | 0.625 | |
| Part 'B' Pack | | |
| Alpha-hemihydrate calcium sulphate plaster (Crystacel) | 46.0 | |
| Pigment powder | 4.0 | |

Example 4
| Part 'A' Pack | Percent by weight | |
|---|---|---|
| Homopolymer of vinyl acetate (unplasticised) | 22.75 | (55% resin solids) |
| Di-butyl glycol phthalate (plasticizer) | 1.25 | |
| Solvent (toluene) | 0.625 | |
| Anti-foaming agent (Nopco) | 0.625 | |
| Water (additional) | 6.75 | |
| Part 'B' Pack | | |
| Alpha-hemihydrate calcium sulphate plaster (Crystacel) | 64.0 | |
| Pigment powder | 4.0 | |

Example 5
| Part 'A' Pack | Percent by weight | |
|---|---|---|
| Styrene/methyl acrylate (3:2) copolymer emulsion | 18.75 | (51% resin solids) |
| Water (additional) | 3.125 | |
| Anti-foaming agent (Nopco) | 1.25 | |
| Xylene (solvent) | 0.625 | |
| Di-octyl phthalate | 1.25 | |
| Part 'B' Pack | | |
| Alpha-hemihydrate calcium sulphate plaster (Crystacel) | 37.5 | |
| Silica flour (−150 + 350 mesh) | 34.5 | |
| Pigment powder | 3.0 | |

Example 6
| Part 'A' Pack | Percent by weight | |
|---|---|---|
| Homopolymer of methyl acrylate emulsion | 33.0 | (55% resin solids) |
| Iso-butyl sextol phthalate | 3.0 | |
| Anti-foaming agent (Nopco) | 1.5 | |
| Solvent | 1.5 | |
| Pigment predispersed paste | 3.0 | |
| Part 'B' Pack | | |
| Alpha-hemihydrate calcium sulphate plaster (Crystacel) | 57.6875 | |
| Potassium sulphate | 0.3125 | |

Example 7
| Part 'A' Pack | Percent by weight | |
|---|---|---|
| Styrene/methyl acrylate (2:3) copolymer emulsion | 12.0 | (51% resin solids) |
| Water (additional) | 6.75 | |
| Urea formaldehyde resin | 12.0 | (90% reactive resin solids) |
| Toluene (coalescence solvent) | 0.625 | |
| Anti-foaming agent (Nopco) | 0.625 | |
| Part 'B' Pack | | |
| Alpha-hemihydrate calcium sulphate plaster (Crystacel) | 66.0 | |
| Pigment powder | 2.0 | |

Example 8
| Part 'A' Pack | Percent by weight | |
|---|---|---|
| Styrene/methyl acrylate (2:3) copolymer emulsion | 18.75 | (51% resin solids) |
| Water (additional) | 3.75 | |
| Xylene (coalescence solvent) | 1.25 | |
| Anti-foaming agent | 1.25 | |
| Part 'B' Pack | | |
| Alpha-hemihydrate calcium sulphate plaster (Crystacel) | 60.0 | |
| Melamino formaldehyde resin solids | 12.0 | |
| Ammonium chloride solid | 1.0 | |
| Colouring pigment powder | 2.0 | |

Example 9
| Part 'A' Pack | Percent by weight | |
|---|---|---|
| Styrene/lower alkyl acrylate (3:2) copolymer emulsion | 21.0 | (51% resin |

-continued

Example 3
Part 'A' Pack

| | Percent by Weight |
| --- | --- |
| | solids) |
| Water (additional) | 7.0 |
| Water-soluble polyvinyl alcohol solid (thickener and stabilizer) | 0.1875 |
| Anti-foaming agent (Bevaloid 581B) | 0.3125 |

Part 'B' Pack

| | |
| --- | --- |
| Alpha-hemihydrate calcium sulphate (Crystacel) | 69.5 |
| Colouring pigment powder | 2.0 |

Example 10
Part 'A' Pack

| | Percent by weight | |
| --- | --- | --- |
| Vinyl/acrylic (3:2) copolymer emulsion (Vinacryl) | 17.5 | (55% solids) |
| Water (additional) | 10.5 | |
| Water-soluble polyvinyl alcohol | 0.25 | |
| Defoaming agent (Bevaloid) | 0.25 | |

Part 'B' Pack

| | |
| --- | --- |
| Alpha-hemihydrate calcium sulphate (Crystacel) | 69.5 |
| Colouring pigment powder | 2.0 |

Example 11
Part 'A' Pack

| | Percent by weight | |
| --- | --- | --- |
| Vinylidene chloride copolymer emulsion (Polidene) | 28.0 | (50% solids) |
| Water (additional) | 4.0 | |
| Anti-foaming agent (Bevaloid) | 0.25 | |

Part 'B' Pack

| | |
| --- | --- |
| Alpha-hemihydrate calcium sulphate | 65.75 |
| Colouring pigment powder | 2.0 |

The following Examples illustrate compositions suitable for underlays.

Example 12
Part 'A' Pack

| | Percent by weight | |
| --- | --- | --- |
| Styrene/lower alkyl acrylate (7:1) copolymer emulsion | 6.0 | (51% solids) |
| Water (additional) | 18.0 | |
| Water-soluble polyvinyl alcohol solid | 0.3 | |
| Anti-foaming agent (Bevaloid) | 0.25 | |

Part 'B' Pack

| | |
| --- | --- |
| Alpha-hemihydrate (Crystacel) | 63.0 |
| China clay sand (−52 + 200 mesh) | 12.45 |

Example 13
Part 'A' Pack

| | Percent by weight | |
| --- | --- | --- |
| Styrene/lower alkyl acrylate (7:1) copolymer emulsion | 5.0 | (51% resin solids) |
| Water (additional) | 15.0 | |
| Anti-foaming agent (Bevaloid) | 0.25 | |

Part 'B' Pack

| | |
| --- | --- |
| Alpha-hemihydrate calcium sulphate | 65.0 |
| China clay sand (−52 + 200 mesh) | 14.75 |

Example 14
Part 'A' Pack

| | Percent by weight |
| --- | --- |
| Styrene/lower alkyl acrylate (7:1) copolymer emulsion | 13.5 |
| Water (additional) | 13.5 |
| Water-soluble polyvinyl alcohol solid | 0.675 |
| Anti-foaming agent (Bevaloid) | 0.25 |

Part 'B' Pack

| | |
| --- | --- |
| Alpha-hemihydrate calcium sulphate | 72.075 |

The following table gives the more important ratios of the ingredients in the Examples.

TABLE

| Example No. | % resin solids | % Water |
| --- | --- | --- |
| 1A. | 12.7 | 22.0 |
| 1B. | 12.7 | 22.0 |
| 2A. | 11.8 | 20.0 |
| 2B. | 17.5 | 30.0 |
| 3. | 26.0 | 80.0 |
| 4. | 17.9 | 27.0 |
| 5. | 24.3 | 33.0 |
| 6. | 28.9 | 27.0 |
| 7. | 25.75 | 25.0 |

TABLE-continued

| Example No. | % resin solids | % Water |
| --- | --- | --- |
| 8. | 33.9 | 20.0 |
| 9. | 15.6 | 25.0 |
| 10. | 13.9 | 26.5 |
| 11. | 21.0 | 27.5 |
| 12. | 4.8 | 33.0 |
| 13. | 3.9 | 27.0 |
| 14. | 9.6 | 28.0 |

The figures in the second column are the percentage by weight of resin solids based on the weight of dry calcium sulphate solids and the figures in the third column are the percentage by weight of water based on the weight of dry calcium sulphate plaster solids.

It will be seen that a relatively high resin solids percentage (based on plaster solids) is used and in fact in most cases this percentage will be at least 10% and in many cases at least 15%, although for some applications, e.g. underlays for carpets, tiles, epoxy, polyester and polyurethanes layers etc., a resin content of 3, preferably 4, to 10% can be used. Normally less than 35% resin solids are used. The water content will normally be adjusted to that required to satisfy the plaster i.e. about 15 to 24% but an excess of say 10% is acceptable where rapid hardening is not of paramount importance and where high strength, impact and abrasion resistance is not required, e.g. when the composition is used for roofing. Thus the amount of water used is normally less than 35%, preferably less than 30% and often no more than 24% based on plaster solids, and therefore encompassing a range from 15% to 35% by weight based on the plaster solids. Hence, in summary, the proportion of dry resin solids is advantageously from 10% to 35% by weight, based on the weight of dry plaster solids, and the amount of water present is advantageously from 15% to 35% by weight, preferably 15% to 24% by weight, based on the dry plaster solids, in the compositions of the invention. As noted above for some applications the proportion of dry resin solids is 3% to 10% by weight, based on plaster solids, with the stated amount of water. The product of Example 3 would be unsuitable for a floor or roof covering but could be used as a soft flexible panel finish. With the preferred compositions, a flooring layer can be used within an hour or so. While we do not wish to be confined to any particular theory, we believe that the plaster forms a rigid crystalline matrix in which the resin is dispersed in the interstices. The resin thus strengthens the plaster and gives it water resistance and the plaster prevents any softening of the resin seriously affecting the properties of the composition. Thus most of the water of the emulsion is removed by being chemically taken up by the $CaSO_4$, and the resin comes out of suspension as the plaster is setting.

Coatings produced by compositions according to the present invention have unexpected wear-resistance and wet strength properties which make them ideal for floor coverings. By a suitable adjustment of the water content in a particular, a uniform level layer of say 1/8th inch thickness can be obtained even on a slightly sloping and uneven surface. This avoids the tedious levelling processes used for, say, concrete floors. The floor coverings can be used on a fibre glass base or on a bitumen base to give a vapour seal (normally the material will be to some extent vapour pervious which will be advantageous under some circumstances).

As plaster expands on setting, the compositions of the invention may conveniently be used for making accurate mouldings e.g. statuettes. Pleasing multicolour tarrazzo effects can be obtained by breaking up sheets of set material of different colours into pieces say ⅛th inch to ½ inch in size and mixing them with wet material of a different colour. Such a mixture when cast can be ground wet or dry to give the required effect.

Versitate-Veovo resins are useful in this invention. They can be used, for example, in a 15:85 ratio with polyvinylacetate to soften it and the resulting resin can be usefully employed in place of the styrene/acrylate copolymers of Examples 1, 2 and 3.

When used as a flooring composition, the material can contain for example an accelerator for a subsequent polyester layer e.g. an organic peroxide dissolved for example in dibutyl phthalate.

The preferred set compositions of the invention have a water absorption figure of 1 to 3% by weight over 48 hours.

The proportions of the essential ingredients in the preferred compositions are as follows (disregarding any filler present).

|  | Percent by weight |
|---|---|
| Polymer resin emulsion (40%–56% resin solids) | 12.0 – 62.0 |
| Temporary plasticizing and coalescent solvent | 0 – 3 |
| Calcium sulphate | 35.0 – 80.0 |
| Water | 0 – 37.0 |
| Anti-foaming agent | 0 – 2 |
| Urea and/or melamine formaldehyde resin | 0 – 15 |

The Nopco anti-foaming agent is a blend of chemically modified naturally occurring oils and fats and the Bevaloid 581B anti-foaming agent (which can equally well be used in the compositions of the Examples) is a mixture of synthetic and natural esters, metallic soap and emulsifiers dispersed in a light hydrocarbon oil.

The resins used in the compositions of this invention should desirably be capable of forming a hard continuous resin film on removal of water. Polyvinyl acetate and polystyrene are too hard in themselves to form films and it is necessary either to blend or copolymerize them with other resins such as acrylates or to use plasticizing agents (including coalescing solvents) (see Example 4) in order to make them film-forming. The term "hard" when used herein in relation to resins is intended to mean a Rocker hardness of about 10% to about 45%. In the Rocker hardness test a pendulum swings over a plate coated with resin and the percentage figure is twice the number of oscillations which the pendulum effects before it is stopped by the drag of the resin (50 oscillations are obtained with a standard glass plate). On this scale the resin of Example 1 has a hardness of about 16%, that of Example 2 about 14%, that of Example 3 about 20%, that of Example 4 about 38%, that of Example 5 about 44%, and that of Examples 7 and 8 about 14%. Example 6 gives a rough film which is difficult to test. The figures are given for the resins without plasticizers.

It has been found that the flexural strength of sheet materials such as hardboard and plaster board can be dramatically increased by coating one or both faces with compositions according to the invention. For even greater flexural strength, reinforcing materials can, if desired, be incorporated in the composition either in membrane or in shredded form. Such reinforcing materials include glass fibre in tissue, matting or chopped strand form as well as nylon and other synthetic forms of netting, hession and cotton scrim. The membranes are embedded in the composition immediately after application and prior to setting whereas the materials in shredded form can be intermixed with the composition prior to application.

By incorporating the above types of reinforcing materials in either of the ways mentioned, the material itself can be cast in sheet or panel form to any desired thickness. Such set sheets or panels have remarkable flexural strength, durability, workability and fire-resistance.

EXAMPLE 15

A composition according to Example 9 was coated with a paint brush onto a piece of hardboard, a chopped fibre glass mat of about 1/32 inch thickness was applied to the wetted surface, and a further layer of composition applied with a paint brush. After the composition set, there was a marked increase in the flexural strength of the hardboard. It was found that, for added strength, successive layers could be applied without waiting for the previous layers to set.

EXAMPLE 16

A composition according to Example 9 is cast by placing a chopper fibre glass mat in a mould, wetting out the mat with the composition and finally pouring more of the composition over the mat to fill the mould. The product is then set. Again successive layers can be built up without setting the composition at each stage.

I claim:

1. A process for making a set composition which comprises providing a composition capable of flowing under its own weight to give a smooth flat surface when applied to a substantially horizontal substrate, said composition consisting essentially of a calcium sulphate alpha-hemihydrate plaster and an aqueous resin emulsion capable of forming a hard continuous resin film on removal of water, said resin being a polymer of an ethylenically unsaturated monomer and having a Rocker hardness of about 10% to about 45% and being in a stable emulsified finely divided form, the relative proportions of the plaster and the resin being such that the plaster takes up the major part of the water in the emulsion when it sets, the proportion of dry resin solids being from 10% to 35% by weight based on the weight of dry plaster solids and the amount of water present being from 15% to 35% by weight based on the weight of dry plaster solids, and allowing said composition to set over a period of time.

2. A process according to claim 1, wherein the amount of water present is from 15% to 24% by weight based on the weight of dry plaster solids.

3. A process according to claim 1, wherein the resin is selected from the group consisting of polymers of alkyl acrylates and methacrylates having 1 to 12 carbon atoms in the alkyl group and copolymers thereof with vinyl acetate or styrene or mixture thereof, polyvinyl acetate and polystyrene.

4. A process according to claim 1 wherein the resin emulsion has a resin particle size of 0.1 to 1.5 microns.

5. A process for making a set composition which comprises providing a self-levelling and self-smoothing fluid plaster composition capable of flowing under its own weight to give a smooth flat surface when applied to a substantially horizontal substrate, said composition consisting essentially of a calcium sulphate alpha-hemihydrate plaster and an aqueous resin emulsion capable of forming a hard continuous resin film on removal of water, said resin being a styrene/alkyl acrylate copolymer and having a Rocker hardness of about 10% to about 45% and being in a stable emulsified finely divided form, the relative proportions of the plaster and the resin being such that the plaster takes up the major part of the water in the emulsion when it sets, the proportion of dry resin solids being from 10% to 35% by weight based on the weight of dry plaster solids and the amount of water present being from 15% to 35% by weight based on the weight of dry plaster solids, and allowing said composition to set over a period of time.

6. A process according to claim 5, wherein the resin emulsion has a resin particle size of 0.1 to 1.5 microns.

7. A process for making a set composition which comprises providing a self-levelling and self-smoothing fluid plaster composition capable of flowing under its own weight to give a smooth flat surface when applied to a substantially horizontal substrate, said composition consisting essentially of a calcium sulphate alpha-hemihydrate plaster and an aqueous resin emulsion capable of forming a hard continuous resin film on removal of water, said resin being a polymer of an ethylenically unsaturated monomer and having a Rocker hardness of about 10% to about 45% and being in a stable emulsified finely divided form, the relative proportions of the plaster and the resin being such that the plaster takes up the major part of the water in the emulsion when it sets, the proportion of dry resin solids being from 10% to 35% by weight based on the weight of dry plaster solids and the amount of water present being from 15% to less than 30% by weight based on the weight of dry plaster solids, and allowing said composition to set over a period of time.

8. A process according to claim 7, wherein the resin is selected from the group consisting of homopolymers of (1) alkyl acrylates and methacrylates in which the alkyl group has up to 12 carbon atoms, (2) vinyl acetate and (3) styrene and copolymers of (1), (2) and (3).

9. A process for making a set composition which comprises providing a self-levelling and self-smoothing fluid plaster composition capable of flowing under its own weight to give a smooth flat surface when applied to a substantially horizontal substrate, said composition consisting essentially of a calcium sulphate alpha-hemihydrate plaster and an aqueous resin emulsion capable of forming hard continuous resin film on removal of water, said resin having a Rocker hardness of about 10% to about 45% and being in a stable emulsified finely divided form, said resin being selected from the group consisting of homopolymers of (i) alkyl acrylates and methacrylates in which the alkyl group has up to twelve carbon atoms, (ii) vinyl acetate and (iii) styrene, copolymers of (i), (ii) and (iii) and mixtures of said homopolymers and copolymers, the proportion of dry resin solids being from 10% to 35% by weight based on the weight of dry plaster solids and the amount of water present being from 15% to 24% by weight based on the weight of dry plaster solids, and allowing said composition to set over a period of time, whereby the plaster takes up substantially all of the water in the emulsion when it sets.

10. A process according to claim 9 wherein the resin is a styrene/alkyl acrylate copolymer.

11. A process for making a set composition which comprises providing a self-levelling and self-smoothing fluid plaster composition capable of flowing under its own weight to give a smooth flat surface when applied to a substantially horizontally substrate, said composition consisting essentially of a calcium sulphate alpha-hemihydrate plaster and an aqueous resin emulsion, said resin being a polymer of an ethylenically unsaturated monomer and having a Rocker hardness of about 10% to about 45% and being in a stable emulsified finely divided form, the relative proportions of the plaster and the resin emulsion being such that the plaster takes up the major part of the water in the emulsion when it sets, the amount of water present being from 15% to 35% by weight based on the weight of dry plaster solids and the dry weight of resin solids being 3% to 10% by weight of the dry plaster solids, and allowing said composition to set over a period of time.

12. A process according to claim 11, wherein the amount of water present is less than 30% by weight based on the weight of dry plaster solids.

13. A process according to claim 12 wherein the amount of water present is from 15% to 24% by weight based on the weight of dry plaster solids.

14. A process according to claim 12, wherein the resin is selected from the group consisting of homopolymers of (1) alkyl acrylates and methacrylates in which the alkyl group has up to 12 carbon atoms, (2) vinyl acetate and (3) styrene and copolymers of (1(2) and (3).

* * * * *